United States Patent [19]

Le Brozec et al.

[11] 4,325,053

[45] Apr. 13, 1982

[54] METHOD AND A CIRCUIT FOR DECODING A C.M.I. ENCODED BINARY SIGNAL

[75] Inventors: Pierre Le Brozec, Perros-Guirec; Francois Ferret, Palaiseau; Pierre Doussoux, Paris, all of France

[73] Assignee: Compagnie Industrielle des Telecommunications, Paris, France

[21] Appl. No.: 58,650

[22] Filed: Jul. 19, 1979

[30] Foreign Application Priority Data

Jul. 26, 1978 [FR] France ............................. 78 22153

[51] Int. Cl.³ .................................... H03K 13/24
[52] U.S. Cl. .................................... 340/347 DD
[58] Field of Search ............... 340/347 DD; 360/43; 375/47, 55

[56] References Cited

U.S. PATENT DOCUMENTS

| | | | |
|---|---|---|---|
| 3,404,391 | 10/1968 | Chur | 360/43 |
| 3,683,277 | 8/1972 | Kuller | 325/30 |
| 3,699,554 | 10/1972 | Jones | 360/43 |
| 3,930,121 | 12/1975 | Mathiesen | 340/347 DD |
| 3,953,673 | 4/1976 | Dorward | 340/347 DD |
| 3,967,061 | 6/1976 | Dobias | 340/347 DD |
| 4,139,870 | 2/1979 | Tachi | 360/43 |

OTHER PUBLICATIONS

Levy, "IBM Technical Disclosure Bulletin", vol. 15, No. 7, Dec. 1972, pp. 2350-2351.

*Primary Examiner*—Charles D. Miller
*Attorney, Agent, or Firm*—Sughrue, Mion, Zinn, Macpeak and Seas

[57] ABSTRACT

A method of decoding a C.M.I. encoded binary signal, the method comprising the steps of: detecting the 0 to 1 transitions in the C.M.I. encoded binary signal; in detecting the 1 to 0 transitions in the same signal; in eliminating from the detected 0 to 1 transitions those transitions which appear one binary bit period after the immediately preceding 1 to 0 transitions; and in using the remaining 0 to 1 transitions to synchronize pulses of a duration equal to one bit period thereby obtaining, after inversion, a signal in NRZ-L code corresponding to the binary data contained in the C.M.I. encoded signal.

3 Claims, 4 Drawing Figures

METHOD AND A CIRCUIT FOR DECODING A C.M.I. ENCODED BINARY SIGNAL

BACKGROUND OF THE INVENTION

The present invention relates to digital transmission, and more particularly to decoding a binary signal which is encoded by alternate mark inversion. Coded mark inversion (C.M.I) is a bi-phase two level transmission code known in full as: "Binary coded alternate mark inversion". This code is defined as follows:

| Binary value | C.M.I. value |
| --- | --- |
| 0 | 01 |
| 1 | 11 or 00 alternately |

This provides a signal having no DC component, and which is transparent to a clock rate signal recoverable from the 1 to 0 transitions which always occur at the end of a bit. Further, since it is easy to implement both for coding and for decoding, it is well adapted for data transmission between equipments operating at a very high binary rate. It is described in particular in contribution No. 14 of the CCITT's special commission D in February 1974 together with a coder and a decoder for its implementation.

The decoding method used in the decoder described in the above article consists in spotting absences of a transition in the received signal by comparing the received signal in an "exclusive nor" logic gate with a version thereof that has been delayed by one-half of a bit period. This method provides a signal in which the binary data is only valid during the second half-period of each bit. This signal is transformed into non return to zero binary data (N.R.Z.-L) by means of a D-type bistable synchronized on the recovered clock rate. This has the drawback, as will be seen below, of requiring special synchronization conditions between the transitions in the received signals and those in the recovered clock rate signals. Meeting these synchronization conditions requires the phase position of the clock rate signal to be rigorously determined during regeneration and greatly limits the maximum tolerable amplitude the jitter in the received signal.

Preferred embodiments of the present invention mitigate the above-mentioned drawback and, consequently, to provide a considerable increase in the maximum amplitude of jitter which can be tolerated in the signal to be decoded.

SUMMARY OF THE INVENTION

The present invention provides a method of decoding a C.M.I. encoded binary signal, the method comprising the steps of: detecting the 0 to 1 transitions in the C.M.I. encoded binary signal; in detecting the 1 to 0 transitions in the same signal; in eliminating from the detected 0 to 1 transitions those transitions which appear one binary bit period after the immediately preceding 1 to 0 transitions; and in using the remaining 0 to 1 transitions to synchronize pulses of a duration equal to one bit period thereby obtaining, after inversion, a signal in NRZ-L code corresponding to the binary data contained in the C.M.I. encoded signal.

Preferably the method consists of:
using the 0 to 1 transitions in the C.M.I. encoded binary signal, i.e. the received signal, to synchronize pulses of duration equal to one half of a bit period in the received signal thereby constituting a first signal;

using the 1 to 0 transitions in the received signal to synchronize pulses of duration equal to one half of a bit period of the received signal to constitute a second signal;

delaying the pulses of the second signal by a period equal to one half of a bit period of the received signal, and in combining them with the pulses of the first signal to form a third signal comprising single pulses of duration equal to one half of a bit period of the received signal and double pulses of duration equal to one bit period of the received signal and formed by juxtaposing one pulse from the second signal with one pulse from the first signal;

eliminating from the first signal those pulses which appear during a double pulse in the third signal thereby constituting a fourth signal with the remaining pulses; and extending the duration of the pulses of the fourth signal to one bit period of the received signal to form a fifth signal which, after being inverted, provides the binary data contained in the received signal in NRZ-L form.

The invention also provides a decoder performing the above methods. The decoder comprises:
an input;
an output;
a first two-input logic gate having a "nor" output, with both of its inputs connected to the input of the decoder, one of its inputs being connected via a first delay circuit which introduces a delay equal to one half of a bit period of the received signal, the other of its inputs being connected via an inverter, and its output providing the first signal;

a second two-input logic gate having a "nor" output, with both of its inputs connected to the input of the decoder, one of its inputs being connected directly and the other being connected via the inverter and a second delay circuit which introduces a delay equal to one half of a bit period of the received signal, and its output delivering the second signal;

a third delay circuit connected to the output of the second logic gate and introducing a delay equal to one half of a bit period of the received signal;

a third two-input logic gate having an "or" output and an "nor" output, with one of its inputs connected to the output of the first logic gate and its other input connected to the output of the third delay circuit, and which delivers the third signal at its "or" output;

a D-type bistable having a data input, a clock input and an inverted output, the bistable being connected via its data input to the output of the first logic gate and via its clock input to the "or" output of the third logic gate;

a fourth delay circuit connected to the "nor" output of the third logic gate and introducing a delay which is at least equal to the propagation delay of the D-type bistable but which is less than one half of a bit period;

a fourth two-input logic gate having an "nor" output, with one of its inputs connected to the inverted output of the D-type bistable and its other input connected to the output of the fourth delay circuit, and whose output delivers the fourth signal; and a fifth two-input logic gate having an "or" output, with both of its inputs connected to the output of the fourth logic gate, one of its inputs being connected directly and the other being connected via a fifth delay circuit which introduces a delay equal to one half of a bit period in the received signal, and whose output is connected to the output of the decoder.

BRIEF DESCRIPTION OF THE DRAWINGS

An embodiment of the invention is described by way of example with reference to the accompanying drawings in which.

DETAILED DESCRIPTION OF THE DRAWINGS

Figure 1:
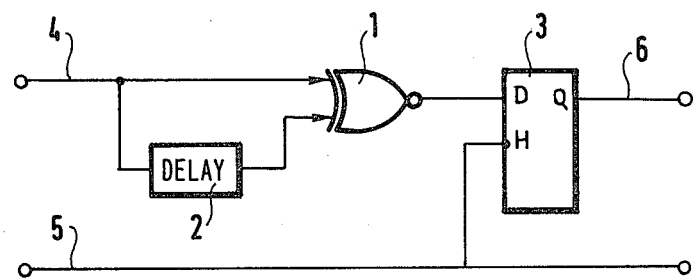
FIG. 1 is a circuit diagram of a binary C.M.I to NRZ-L decoder according to the prior art.

The prior art decoder shown in FIG. 1 comprises a two-input "exclusive-nor" logic gate 1, a delay circuit 2 and a D-type bistable 3 triggered by the rising edges of its clock signal. The "exclusive nor" gate 1 has both of its inputs connected to the input 4 of the decoder, one of them directly and the other via the delay circuit 2 which introduces a delay equal to one half of a bit period in the received signal. The D-type bistable 3 has its data input D connected to the output of the "exclusive nor" gate, its clock input H connected to a line 5 on which there is a signal at the recovered clock rate, and its output Q connected to the output 6 for the decoder.

Figure 2:
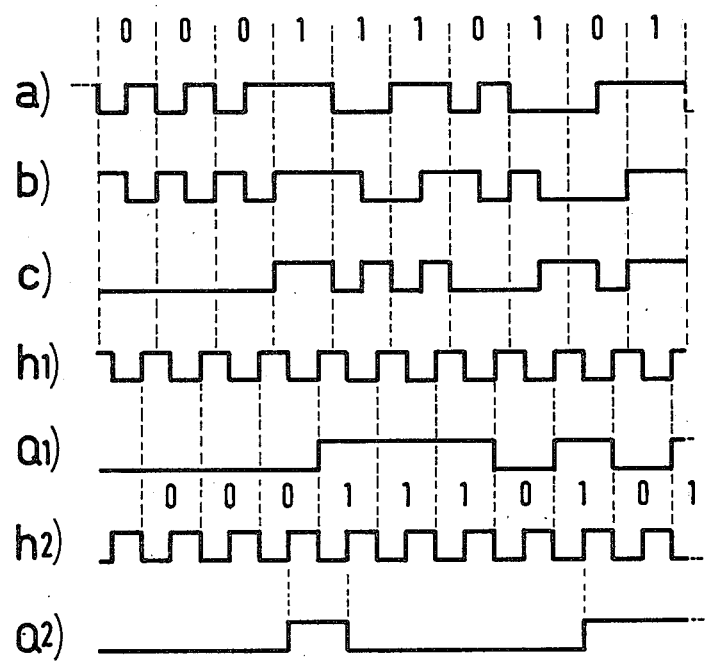
FIG. 2 is a set waveform diagrams illustrating the operation of the decoder in FIG. 1.

The operation of this decoder is illustrated by means of the waveform of the diagrams of FIG. 2 which represent the following signals: a is a coded mark inversion signal, b is the output from the delay circuit 2, c is the output of the logic gate 1, $h_1$ and $h_2$ are two different regenerated clock rate signals at different phase positions and $Q_1$ and $Q_2$ are the output signals from the decoder corresponding respectively to the signals $h_1$ and $h_2$.

The coded mark inversion signal shown at a includes all possible configurations. Its binary meaning is indicated by the series of 0s and 1s written above it. The version delayed by a half-bit period shown by the waveform b is deduced from the waveform a by a shift to the right.

The signal delivered by the "exclusive nor" gate 1 shown by the waveform c is constituted by a sequence of single or double pulses which appear each time the received signal (waveform a) has the same value as its delayed version (waveform b) in other words in the absence of a transition after a half-bit period in the received signal. It is easy to see from the figure that this signal has the property of corresponding to the binary value of each bit during the second half-bit period corresponding thereto.

The D-type bistable 3 serves to avoid taking account of the output level of the logic "exclusive nor" gate 1 during the first half of each bit in the received signal. To do this it must receive a recovered clock rate signal which a rising edge during the second half of each bit of the received signal. This is true for the recovered clock rate signal shown by the waveform $h_1$ which serves to provide an output signal from the D-type bistable 3 (waveform $Q_1$) which is the translation in NRZ-L code of the data contained in the coded mark inversion signal (waveform a) applied to the input 4 of the decoder. However, if this condition is not fulfilled, as is the case for the recovered clock rate signal shown by the waveform $h_2$, the signal obtained at the output of the D-type bistable 3 (waveform $Q_2$) bears no relationship with the NRZ-L translation of the binary data contained in the input signal, and the decoder functions incorrectly.

Meeting this synchronization condition limits the maximum amplitude of jitter which can be tolerated in the input signal and makes it necessary to hold the clock rate signal in a close phase relationship with the input signal after recovery thereof.

Figure 3:
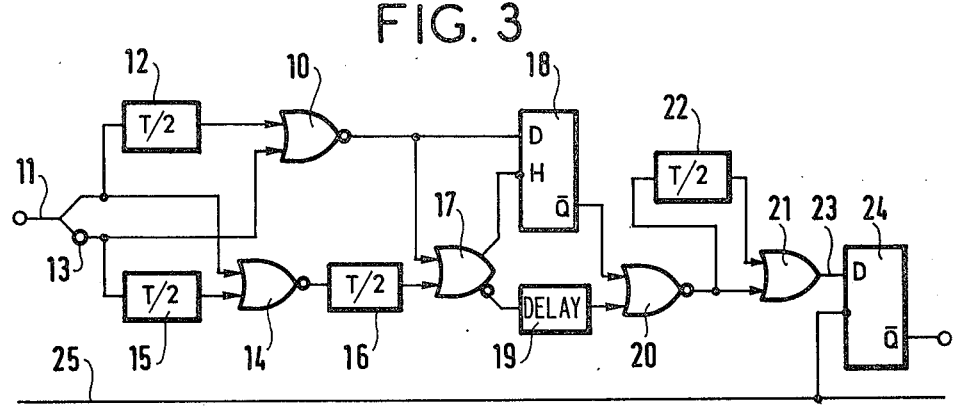
FIG. 3 is a circuit diagram of a binary C.M.I. to NRZ-L decoder in accordance with the invention.

FIG. 3 is the circuit diagram of a decoder embodying the invention and avoiding the above limitation, together with a circuit for re-establishing the phase position of the decoded signal. The decoder comprises:

a first two input logic gate 10 having a "nor" output, with both of its inputs connected to the input 11 of the decoder, one via a first delay circuit 12 and the other by an inverter 13;

a second two-input logic gate 14 having a "nor" output, with both of its inputs connected to the input 11 of the decoder, one directly and the other via a second delay circuit 15 in series with the inverter 13;

a third delay circuit 16 connected to the output of the second logic gate 14;

a third two-input logic gate 17 having an "or" output and a "nor" output, with one of its inputs connected to the output of the first logic gate 10 and its other input connected to the third delay line 16;

a D-type bistable 18 having a data input, a clock input and an inverted output, its data input being connected to the output of the first logic gate 10 and its clock input connected to the "or" output of the third logic gate 17;

a fourth delay circuit 19 connected to the "nor" output of the third logic gate 17;

a fourth two-input logic gate 20 having a "nor" output, connected via one of its inputs to the inverted output of the D-type bistable 18 and via its other input to the output of the fourth delay circuit 19; and a fifth two-input logic gate 21 having an "or" output, with both of its inputs connected to the output of the fourth logic gate 20, one of them directly and the other via a fifth delay circuit 22, and whose output 23 constitutes the output of the decoder.

The first, second, third and fifth delay circuits 12, 15, 16 and 22, each introduces a delay equal to one half of a bit period in the received signal. The fourth delay circuit 19 introduces a delay which is at least equal to the propagation delay of the D-type bistable 18 and which is less than the half period of a bit. For example, it will be considered below to have a delay equal to the propagation delay of the bistable 18.

The circuit for re-phasing the decoded signal is constituted by a further D-type bistable 24 with its data input connected to the output 23 of the decoder and its clock input connected to a line 25 on which the regenerated clock rate signal is available.

Figure 4:
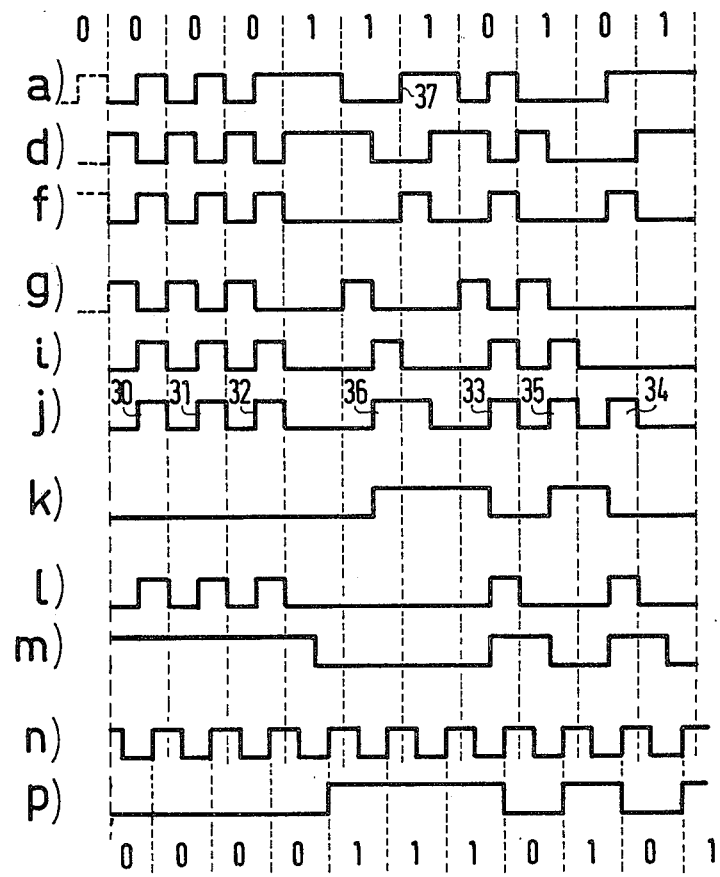
FIG. 4 is a set of waveform diagrams explaining the operations of the decoder of FIG. 3.

The operation of the decoder shown in FIG. 3 is explained by means of the waveform diagrams in FIG. 4 which represent the following signals:

a the coded mark inversion signal applied to the input of the decoder;

d the signal at the output of the first delay circuit 12;

f the signal at the output of the first logic gate 10;

g the signal at the output of the second logic gate 14;

i the signal at the output of the third delay circuit 16;

j the signal at the "or" output of the third logic gate 17;

k the signal at the inverted output of the D-type bistable 18;

l the signal at the output of the fourth logic gate 20;
m the signal of the output of the fifth logic gate 21;
n a regenerated clock rate signal; and
p the signal at the inverted output of the D-type bistable 24 provided in response to the signals a and n. For the sake of clarity, the propagation delays of the bistables and the logic gates are not shown, and in any case they are short in comparison to one bit period.

The coded mark inversion signal applied to the input 11 of the decoder and shown by the waveform a is the same as that used above for describing the operation of the decoder shown in FIG. 1. It includes all possible configurations of a C.M.I. signal and it represents the binary values shown by the series of 0s and 1s written above it.

The circuit constituted by the first logic gate 10, the first delay circuit 12 and the inverter 13 delivers a first signal (waveform f) formed by a series of pulses of duration equal to one half-bit period of the received signal and synchronized on the 0 to 1 transitions therein. These pulses are the result of the logic "nor" operation performed on two versions of the received signal, one version being inverted and the other (waveform d) being delayed by one half-bit period of the received signal.

The circuit constituted by the second logic gate 14, a "nor" gate, in inverter 13 and the second delay circuit 15 delivers a second signal (waveform g) in the form of a series of pulses, of period equal to one half-bit period of the received signal and synchronized on the 1 to 0 transitions in the received signal. These pulses result from the logic "nor" operation performed on the received signal and a version thereof which is inverted and delayed by one half-bit period.

The third logic gate 17 delivers a third signal at its "or" output (waveform j) combining the pulses from the first signal with those from the second signal after a delay of one half-bit period. The third signal comprises single pulses of duration equal to one half-bit period and double pulses of duration equal to one bit period. The single pulses are synchronized either with a 0 to 1 transition in the received signal preceded by a 1 to 0 transition appearing one half-bit period earlier (pulses 30, 31, 32, 33), or on a 0 to 1 transition in the received signal following a 1 to 0 transition after an interval of three half-bit periods (pulse 34) or, with a delay of one half-bit period, on a 1 to 0 transition in the received signal which is not followed by a 0 to 1 transition in less than three half-bit periods (pulse 35). Each double pulse corresponds to two juxtaposed pulses, the first coming from the second signal and corresponding to a 1 to 0 transition in the received signal after a delay of one half-bit period, and the second coming from the first signal and corresponding to a 0 to 1 transition in the received signal occuring one bit-period after a 1 to 0 transition. The 0 to 1 transition (37 in waveform a FIG. 4) on which a double pulse of the third signal is centered, is characterized by the fact that it occurs one bit period after the preceding 1 to 0 transition. This is the only such transition in C.M.I. coding which does not correspond to a binary value of 0 but which corresponds instead to a transition between two successive binary 1s. Consequently, a series of pulses can be obtained synchronized on the middles of the 0 value bits of the received signal by suppressing those pulses which appear in the first signal (waveform f) which occur during a double pulse in the third signal (waveform j). This is the purpose of the circuit constituted by the D-type bistable 18, a fourth delay circuit 19 and the fourth logic gate 20.

At its inverted output $\overline{Q}$, the D-type bistable 18 produces a masking signal (waveform k) which inhibits the fourth logic gate 20 during double pulses in the third signal, or during those single pulses therein which, after a half-bit period delay, are synchronized on 1 to 0 transition in the received signal and which are not followed by a 0 to 1 transition during the next three half-bit periods. The fourth logic gate 20 delivers a fourth signal (waveform l) constituted by a series of pulses synchronized on the middles of the 0 value bits of the received signal.

The circuit constituted by the fifth logic gate 21 and the fifth delay circuit 22 doubles the duration of the pulses which it receives and delivers a fifth signal (waveform m) which, after inversion, delivers an NRZ-L version of the binary data contained in the C.M.I.-coded received signal.

The re-phasing circuit constituted by the D-type bistable 24 synchronizes the transitions in the fifth signal on the rising edges in the regenerated clock rate signal (waveform n). It also performs the required inversion, but that could be done elsewhere.

Since the final pulse shaping of the binary signal takes place over a complete bit period, any requirement to maintain a rigorous phase relationship between the initially decoded binary signal and the regenerated clock rate signal is avoided. Because of this, a decoder in accordance with the invention can tolerate large amplitude jitter in the received signal.

It will be understood that the values indicated above for the delays introduced by the various delay circuits are theoretical values and in practice the real values of these delays may be slightly different. It will be observed in particular that if the delays introduced by the circuits 12 and 15 are not exactly equal to one half-bit period, it will be advantageous to choose a delay for the circuit 16 whose value is slightly longer than a half-bit period and a delay for the circuit 22 whose real value is slightly less than a half-bit period, thereby avoiding any risk of uncertain operation which could generate short noise pulses in the decoded signal.

Without going beyond the scope of the invention it is possible to modify certain arrangements or to replace certain means by equivalent means.

We claim:

1. An apparatus for decoding a coded mark inversion (C.M.I.) encoded binary received signal representing a sequence of binary data bits, with each bit occupying a binary bit period, said apparatus comprising:
   means for detecting zero-to-one transitions in said received signal;
   means for detecting one-to-zero transitions in said received signal; and
   signal generating means for generating from said received signal a further signal comprising a sequence of pulses each of one bit period duration and synchronized to all zero-to-one transitions in said received signal except any zero-to-one transition which occurs one binary bit period after the immediately preceding one-to-zero transition in said received signal, said further signal comprising an inverted, NRZ-L signal representation of the binary data contained in said received signal.

2. An apparatus according to claim 1, wherein:
   said means for detecting said zero-to-one transitions in said received signal comprises means for generating a first signal (f) including a sequence of pulses each of one-half bit period duration and synchronized to said zero-to-one transitions in said received signal;

said means for detecting the one-to-zero transitions in said received signal comprises means for generating a second signal (g) including a sequence of pulses of one-half bit period duration and synchronized to said one-to-zero transitions in said received signal; and said means for generating a further signal comprises means for delaying (i) said second signal by one-half bit period of said received signal, means for combining said first signal with said delayed second signal to form a third signal including single pulses of one-half bit period duration and double pulses of one bit period duration and corresponding to a logical OR combination of said first and delayed second signals, means for generating a fourth signal (1) identical to said first signal except not having any pulse corresponding to a pulse in said first signal occurring during a double pulse in said third signal, and means for generating a fifth signal by extending to one bit period the duration of the pulses of said fourth signal, said fifth signal comprising said decoded output signal.

3. A decoding circuit for decoding a coded mark inversion (C.M.I.) encoded binary received signal, the decoding circuit comprising:

an input;

an output;

a first two-input logic gate having a "nor" output, with both of its inputs connected to the input of the decoder, one of its inputs being connected via a first delay circuit which introduces a delay equal to one half of a bit period of the received signal, the other of its inputs being connected via an inverter, the output of the first gate providing a first signal;

a second two-input logic gate having a "nor" output, with both of its inputs connected to the input of the decoder, one of its inputs being connected directly and the other being connected via the inverter and a second delay circuit which introduces a delay equal to one half of a bit period of the received signal, the output of the second gate delivering a second signal;

a third delay circuit connected to the output of the second logic gate and introducing a delay equal to one half of a bit period of the received signal;

a third two-input logic gate having an "or" output and an "nor" output, with one of its inputs connected to the output of the first logic gate and its other input connected to the output of the third delay circuit, the third gate delivering a third signal at its "or" output;

D-type bistable means having a data input, a clock input and an inverted output, the bistable means being connected at its data input to the output of the first logic gate and at its clock input to the "or" output of the third logic gate;

a fourth delay circuit connected to the "nor" output of the third logic gate and introducing a delay which is at least equal to the propagation delay of the D-type bistable but which is less than one half of a bit period;

a fourth two-input logic gate having an "nor" output, with one of its inputs connected to the inverted output of the D-type bistable and its other input connected to the output of the fourth delay circuit, the output of the fourth gate delivering a fourth signal; and a fifth two-input logic gate having an "or" output, with both of its inputs connected to the output of the fourth logic gate, one of its inputs being connected directly and the other being connected via a fifth delay circuit which introduces a delay equal to one half of a bit period in the received signal, the output of the fifth gate providing a decoder output.

* * * * *